US009032157B2

(12) United States Patent  (10) Patent No.: US 9,032,157 B2
Ghai et al.  (45) Date of Patent: *May 12, 2015

(54) VIRTUAL MACHINE FAILOVER

(71) Applicant: International Business Machines Corporation, Armonk, NY (US)

(72) Inventors: Sanjeev Ghai, Round Rock, TX (US); Guy L. Guthrie, Austin, TX (US); Geraint North, Manchester (GB); William J. Starke, Round Rock, TX (US); Phillip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 192 days.

This patent is subject to a terminal disclaimer.

(21) Appl. No.: 13/711,004

(22) Filed: Dec. 11, 2012

(65) Prior Publication Data

US 2014/0165056 A1  Jun. 12, 2014

(51) Int. Cl.
  *G06F 12/12*  (2006.01)
  *G06F 9/455*  (2006.01)
  *G06F 12/08*  (2006.01)
  *G06F 11/00*  (2006.01)

(52) U.S. Cl.
  CPC ........ *G06F 9/45533* (2013.01); *G06F 12/0891* (2013.01); *G06F 11/00* (2013.01)

(58) Field of Classification Search
  None
  See application file for complete search history.

(56) References Cited

U.S. PATENT DOCUMENTS

| 5,299,144 | A | * | 3/1994 | Bartkowiak et al. | .......... 708/200 |
| 5,448,719 | A | * | 9/1995 | Schultz et al. | ................ 711/141 |
| 5,650,993 | A | * | 7/1997 | Lakshman et al. | ............ 370/236 |
| 5,721,830 | A | * | 2/1998 | Yeh et al. | ...................... 709/237 |
| 5,893,155 | A |   | 4/1999 | Cheriton | |
| 5,920,572 | A | * | 7/1999 | Washington et al. | ......... 370/535 |
| 6,073,228 | A | * | 6/2000 | Holmqvist et al. | ........... 711/217 |

(Continued)

OTHER PUBLICATIONS

Inigo Goiri et al.; "Checkpoint-Based Fault-Tolerant Infrastucture for Virtualized Service Providers", Barcelona Supercomputing Center and Technical Univ. of Catalonia, Barcelona, Spain; 2010 IEEE/IFIP Network Operations and Management Symposium—NOMS 2010.

*Primary Examiner* — Daniel Bernard
(74) *Attorney, Agent, or Firm* — Russell Ng PLLC; Matthew Baca

(57) ABSTRACT

Disclosed is a computer system (100) comprising a processor unit (110) adapted to run a virtual machine in a first operating mode; a cache (120) accessible to the processor unit, said cache comprising a plurality of cache rows (1210), each cache row comprising a cache line (1214) and an image modification flag (1217) indicating a modification of said cache line caused by the running of the virtual machine; and a memory (140) accessible to the cache controller for storing an image of said virtual machine; wherein the processor unit comprises a replication manager adapted to define a log (200) in the memory prior to running the virtual machine in said first operating mode; and said cache further includes a cache controller (122) adapted to periodically check said image modification flags; write only the memory address of the flagged cache lines in the defined log and subsequently clear the image modification flags. A computer cluster including such computer systems and a method of managing such a computer cluster are also disclosed.

9 Claims, 7 Drawing Sheets

(56) References Cited

U.S. PATENT DOCUMENTS

| | | |
|---|---|---|
| 8,127,174 B1 | 2/2012 | Shah et al. |
| 8,201,169 B2 | 6/2012 | Venkitachalam et al. |
| 8,429,307 B1* | 4/2013 | Faibish et al. ............... 710/5 |
| 2003/0135694 A1* | 7/2003 | Naffziger et al. ............ 711/118 |
| 2006/0184937 A1* | 8/2006 | Abels et al. ................. 718/1 |
| 2010/0042672 A1* | 2/2010 | Lo et al. ..................... 709/203 |
| 2010/0228819 A1* | 9/2010 | Wei .............................. 709/203 |
| 2011/0219208 A1 | 9/2011 | Asaad et al. |
| 2011/0234200 A1* | 9/2011 | Shenoi ........................ 324/76.38 |
| 2012/0084782 A1 | 4/2012 | Chou et al. |
| 2012/0117562 A1* | 5/2012 | Jess et al. .................... 718/1 |
| 2014/0201462 A1* | 7/2014 | Maharana et al. ........... 711/142 |

\* cited by examiner

VIRTUAL MACHINE FAILOVER

FIELD OF THE INVENTION

The present invention relates to a computer system comprising a processor unit adapted to run a virtual machine in a first operating mode; a cache accessible to the processor unit, said cache including a cache controller; and a memory accessible to the cache controller for storing an image of said virtual machine.

The present invention further relates to a computer cluster comprising a plurality of such computer systems.

The present invention yet further relates to a method of operating a computer cluster comprising a first system and a second system each including a memory comprising an image of a virtual machine, at least one processor unit, and a cache accessible to the at least one processor unit.

BACKGROUND

Virtualization is commonly applied on computer clusters to improve the robustness of the implemented computing architecture to faults and to increase utilization of the resources of the architecture. In a virtualized architecture, the processor units, e.g. processors and/or processor cores, of the computer systems in the cluster act as the physical hosts of virtual machines (VMs), which are seen by the outside world as independent entities. This facilitates robustness of the architecture to hardware failures, as upon a hardware failure, a VM previously hosted by the failed hardware may be fail over to another host in some manner without the user becoming aware of the hardware failure. This concept is an important facilitator of so-called 'high availability' of a service provided by such a VM.

Implementing such a failover is not a trivial task, as the VM ideally should be re-launched in a state that is identical to the state of the VM at the point of the hardware failure to avoid inconvenience to the user.

In one approach, failover is provided by running multiple copies of a single VM in lock-step on different entities, e.g. different physical servers, such that upon the failure of one entity another entity can take over the responsibility for hosting the VM. A significant drawback of such lock-step arrangements is that processing resources are consumed by a failover copy of a VM, thus reducing the available bandwidth of the system, i.e. reducing the total number of VMs that can be hosted by a system.

In another approach commonly found in commercial products, a physical host responds to a failure of another physical host by simply rebooting the VM from a shared disk state, e.g. a shared image of the VM. This however increases the risk of disk corruption and the loss of the exposed state of the VM altogether.

A different failover approach is disclosed in "Remus: High Availability via Virtual Machine Replication" by Brendan Cully et al. in NSDI'08 Proceedings of the 5$^{th}$ USENIX Symposium on Networked Systems Design and Implementation, 2008, pages 161-174. In this approach, all VM memory is periodically marked as read only to allow for changes to the VM memory to be replicated in a copy of the VM memory on another host. In this read-only state, a hypervisor is able to trap all writes that a VM makes to memory and maintain a map of pages that have been dirtied since the previous round. Each round, the migration process atomically reads and resets this map, and the iterative migration process involves chasing dirty pages until progress can no longer be made. This approach improves failover robustness because a separate up to date image of the VM memory is periodically created on a backup host that can simply launch a replica of the VM using this image following a hardware failure of the primary host.

However, a drawback of this approach is that as the VM remains operational during the read-only state of its VM memory, a large number of page faults can be generated. In addition, this approach does not allow for the easy detection of what portion of a page has been altered, such that whole pages must be replicated even if only a single bit has been changed on the page, which is detrimental to the overall performance of the overall architecture, as for instance small page sizes have to be used to avoid excessive data traffic between systems, which reduces the performance of the operating system as the operating system is unable to use large size pages.

U.S. Pat. No. 5,893,155 discloses a digital computer memory cache organization implementing efficient selective cache write-back, mapping and transferring of data for the purpose of roll-back and roll-forward of e.g. databases. Write or store operations to cache lines tagged as logged are written through to a log block builder associated with the cache. Non-logged store operations are handled local to the caches, as in a writeback cache. The log block builder combines write operations into data blocks and transfers the data blocks to a log splitter. A log splitter demultiplexes the logged data into separate streams based on address.

In short, the above approaches are not without problems. For instance, during suspension of the VM, the cache is sensitive to page faults as the cache is put into a read-only state, as previously explained. Furthermore, large amounts of data may have to be stored for each checkpoint, which causes pressure on the resource utilization of the computing architecture, in particular the data storage facilities of the architecture.

BRIEF SUMMARY OF THE INVENTION

The present invention seeks to provide a computer system according to the opening paragraph in which VM replication can be achieved in a more efficient manner.

The present invention further seeks to provide a computer cluster including a plurality of such systems.

The present invention yet further seeks to provide a method of managing such a computer cluster in which VMs can be replicated in a more efficient manner.

According to an aspect of the present invention, there is provided a computer system comprising a processor unit adapted to run a virtual machine in a first operating mode; a cache accessible to the processor unit, said cache comprising a plurality of cache rows, each cache row comprising a cache line and an image modification flag indicating a modification of said cache line caused by the running of the virtual machine; and a memory accessible to the cache controller for storing an image of said virtual machine; wherein the processor unit comprises a replication manager adapted to define a log in the memory prior to running the virtual machine in said first operating mode; and said cache further includes a cache controller adapted to periodically check said image modification flags, write only the memory address of the flagged cache lines in the defined log and clear the image modification flags.

In the computer system of the present invention, a processor unit is adapted to host a VM (in the first operating mode) as well as act as an VM image replication manager to create a replica of a VM image in another location, e.g. in the memory of another computer system. The present invention is based on the insight that as all changes made to an image of an active VM by the processor unit hosting the VM will travel through its cache, it is possible to simply log the memory address associated with a dirty cache line. To this end, the cache rows include an image modification flag that signal the modification of a cache line by the execution of the VM, i.e. that signal a change to the VM image, which has the advantage that the memory addresses of the dirty cache lines can be written to the log without requiring the expulsion of the dirty cache lines from the cache at the same time, which would be the case if the relevant memory addresses would be identified on the basis of a dirty bit tag used to write modified cache lines to the memory of the computer system instead. Hence, the use of an additional bit flag that signals modification of a cache line by execution of a VM ensures that the memory addresses of the thus modified cache lines can be written to the log without at the same time requiring the cache lines to be flushed from the cache, thus significantly reducing the amount of data that needs to be transferred from the cache when updating the log.

The cache controller typically is further adapted to write the memory address of a flagged cache line in the defined log upon the eviction of said flagged line from the cache to capture flagged changes to the VM image that no longer are guaranteed to be present in the cache during the periodic inspection of the image modification tags.

Preferably, the computer system further comprises a processor unit adapted to update a further image of the virtual machine in a different memory location by retrieving the memory addresses from the log; obtaining the modified cache lines using the retrieved memory addresses; and updating the further image with said modified cache lines, such that the logged memory addresses are used to copy only the altered data of the primary image to the copy of the VM image, which copy may for instance be located on another computer system.

In this manner, VM images may be synchronized without the need to incur additional page faults and reduces the traffic between systems due to the smaller granularity of the data modification, i.e. cache line-size rather than page size and due to the fact that the VM is suspended during image replication, thus obviating the need for page protection. This approach is furthermore page size-agnostic such that larger page sizes can be used than for instance is the case in the Remus approach. Moreover, the additional hardware cost to the computer system is minimal; only minor changes to the cache controller, e.g. to the cast-out engine and the snoop-intervention engine of the cache controller, and to the cache rows of the cache are required to ensure that the cache controller periodically writes the memory address of the dirty cache line in the log by periodic inspection of the image modification flag during the execution of the VM.

The present invention may replicate data from the primary VM image to a copy in push or pull fashion. In a push implementation, a processor unit from the same computer system, e.g. the processor unit running the VM or a different processor unit, may be also responsible in a second operating mode, e.g. under control of the replication manager, for updating the copy of the image of the VM in the different memory location, which may be a memory location in the memory of the same computer system or a memory location in the memory of a different computer system. In a pull implementation, a processor unit of a different computer system may be adapted to update the copy of the VM image in the a memory location on this different computer system by pulling the memory addresses and associated modified cache lines from the computer system hosting the VM.

The cache may include a write-back cache, which may form part of a multi-level cache further including a write-through cache adapted to write cache lines into the write-back cache, wherein only the cache rows of the write-back cache comprise said flag. As by definition the cache lines in a write-through cache cannot get dirty because cache line modifications are also copied to a write-back cache, only the write-back caches need inspecting when periodically writing the memory addresses to the log.

In an embodiment, the log is a circular buffer and the system comprises a plurality of registers adapted to store a first pointer to a wrap-around address of the circular buffer; a second pointer to the next available address of the circular buffer; a third pointer to an initial address of the circular buffer; and the size of the circular buffer; and the cache controller is adapted to update at least the second pointer following the writing of a memory address in the log.

This is a particularly advantageous embodiment of the log, as the size of the log is defined prior to its use, thus avoiding conflicts in (the system) memory, and facilitating monitoring of the fill level of the log by the replication manager such that the replication manager can invoke the synchronization mode for updating the secondary VM if the fill level of the log approaches the capacity of the log, i.e. when the log is almost full. In this embodiment, the system, e.g. the processor unit or the cache controller, comprises dedicated registers that are accessible to the cache controller and that allow for the monitoring of the fill level of the circular buffer, e.g. by the cache controller or by the replication manager.

Preferably, each processor unit is configured to deduplicate the memory addresses in the log prior to the retrieval of the addresses from the log. This reduces the amount of time required for synchronizing data between the memories respectively comprising the image of the VM and its copy because it is ensured that the altered data in a logged memory location is copied once only, thus further reducing the amount of time the primary VM is suspended.

In accordance with another aspect of the present invention, there is provided a computer cluster comprising a plurality of computer systems according to an embodiment of the present invention and a network interconnecting the plurality of computer systems. Such a cluster offers a better user experience as improved failover between VMs hosted by the computer systems is achieved for the reasons given above.

In accordance with yet another aspect of the present invention, there is provided a method of operating a computer cluster comprising a first computer system including a memory comprising an image of a virtual machine, at least one processor unit adapted to run the virtual machine in a first operation mode, and a cache accessible to the at least one processor unit, said cache comprising a plurality of cache rows, each cache row comprising a cache line and an image modification flag indicating a modification of said cache line caused by the running of the virtual machine, wherein in said first operation mode, a processor unit of the first computer system performs the steps of: defining a log in the memory of the first computer system; running the virtual machine using said image; upon modifying a cache line of the cache during said running step, signaling said modification by setting the image modification flag of the cache row comprising the modified cache line; and periodically checking said image modification flags; and wherein the processor unit of the first computer system performs the further steps of writing the memory addresses only of the flagged modified cache lines to said log and clearing the image modification flags following said writing step.

In this manner, the log is updated with the memory addresses of the modified cache lines without the need to flush the modified cache lines from the cache at the same time, thus providing a method in which VM image replication data is generated at minimal data bandwidth.

The processor unit typically further performs the step of writing the memory address of a flagged cache line in the defined log upon the eviction of said flagged line from the cache to capture flagged changes to the VM image that no longer are guaranteed to be present in the cache during the periodic inspection of the image modification tags.

In an embodiment, the method further comprises the step of updating a further image of the virtual machine by periodically reading the memory addresses from the log in the memory; obtaining the cache lines using said memory addresses; and updating the further image with obtained cache lines. This ensures that a copy of a VM may be periodically updated without requiring dirty cache lines to be flushed from the cache, as the dirty cache lines may be retrieved from the cache in which they reside e.g. by a snoop-intervention engine recognizing the requested memory address and casting the associated cache line from the cache.

Preferably, the step of updating a further image of the virtual machine is performed by a further processor unit of the first computer system, as this facilitates the embodiment in which the steps of running the virtual machine and updating the further image of the virtual machine are performed at least partially concurrently, which reduces the amount of time a VM is suspended for when the further image is being updated.

In an embodiment, the computer cluster further comprises a second computer system including a further memory comprising the further image, at least one further processor unit, and a further cache accessible to the at least one further processor unit, wherein each further processor unit is adapted to run the virtual machine in a first operation mode using said further image.

In another embodiment, the method further comprises the step of deduplicating the memory addresses in the log prior to said periodically reading step, such that multiple accesses of the same data are avoided and a further smoothening of the data transfer between computer systems is achieved. The deduplication concept may be advantageously extended to cover an embodiment in which the first computer system comprises a plurality of processor units hosting the virtual machine, each processor unit of said plurality having access to a separate cache associated with a respective log in the memory of the first computer system, wherein said deduplication step comprises deduplicating addresses across the respective logs.

To aid management of the log, each computer system may further comprise a plurality of registers for managing said log, wherein the step of writing the memory addresses in the log may further comprise updating at least some of said registers to reflect the addition of said memory addresses to said log. The registers may reside in the processor unit or in the cache controller as previously explained.

BRIEF DESCRIPTION OF THE DRAWINGS

Preferred embodiments of the present invention will now be described, by way of example only, with reference to the following drawings, in which.

DETAILED DESCRIPTION OF THE EMBODIMENTS

Figure 1:
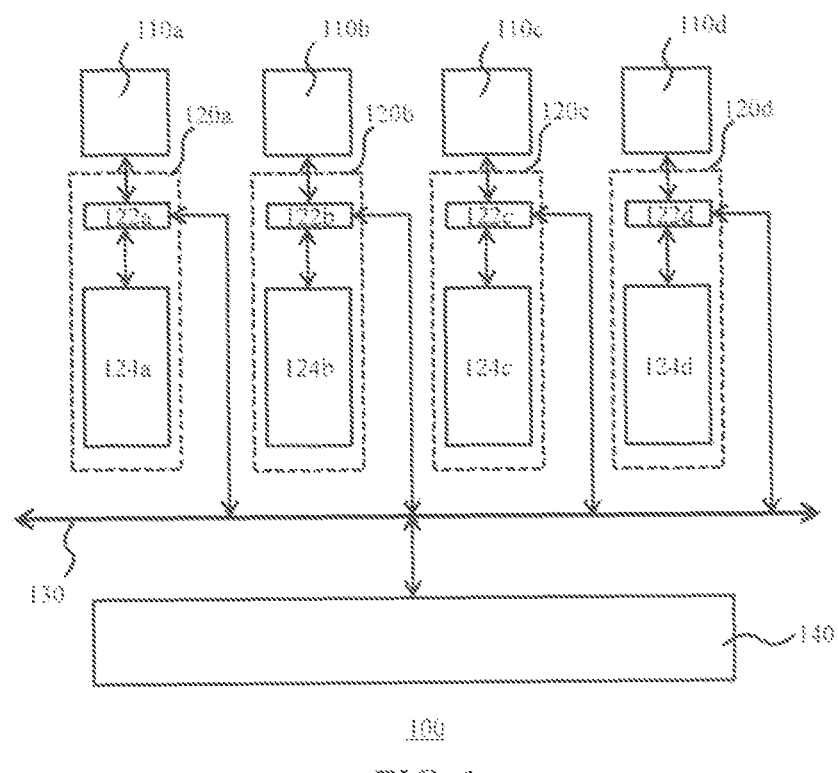
FIG. 1 schematically depicts a computer system according to an embodiment of the present invention.

It should be understood that the Figures are merely schematic and are not drawn to scale. It should also be understood that the same reference numerals are used throughout the Figures to indicate the same or similar parts.

FIG. 1 schematically depicts a computer system 100 according to an embodiment of the present invention. The computer system 100 comprises a plurality of processor units 110 for hosting a number of virtual machines. In FIG. 1, four processor units 110a-110d are shown by way of non-limiting example only; it should be understood that the computer system 100 may comprise any suitable number of processor units.

In the context of the present invention, a processor unit is intended to embody a unit of hardware that is capable of (pseudo-)autonomous execution of a computer program code, such as a processor, microprocessor or a core of a processor or microprocessor comprising a plurality of such cores.

Each processor unit 110 further has access to a cache 120, which typically includes a cache controller 122 in addition to a pool of entries 124, with each entry including a cache line and one or more tags. Any suitable cache architecture may be used, e.g. a single cache or several levels of cache, such as a level-1 cache, a level-2 cache and a level-3 cache or suitable subsets thereof. The cache 120 may reside in any suitable location. For instance, the cache 120 may be located on or in the vicinity of the processor unit 110 to ensure a significant reduction in data retrieval latency as is well-known per se.

In the embodiment shown in FIG. 1, each processor unit 110 has access to a dedicated cache 120, i.e. four cache 120a-d are shown by way of non-limiting example only, one for each of the processor units 110a-d. However, it should be understood that any suitable configuration may be chosen, e.g. a configuration in which a processor unit 110 has access to multiple caches 120, which may be organized in a hierarchical structure, e.g. a combination of a level-1, level-2 and level-3 cache, as previously explained.

Each processor unit 110 is typically communicatively coupled to bus architecture 130 through its cache 120, at least at a functional level. This means that any access of data by a processor unit 110 will involve its cache 120, as is commonly the case in such computer systems. The exact nature and connectivity of the bus architecture is not particularly relevant to the present invention, and it suffices to say that any suitable bus architecture 130 may be chosen.

The computer system 100 further comprises a memory 140 coupled to the bus architecture 130, which again may take any suitable form, e.g. a memory integrated in the computer system or a distributed memory accessible over a network. The memory may be volatile memory or a non-volatile memory, and may be a virtual memory, e.g. include data storage devices such as hard disks, which may be located in the computer system 100 or may be accessible via a network, e.g. a storage area network or network-attached storage. Many other suitable embodiments of such a memory 140 will be apparent to the skilled person.

Although not specifically shown, the computer system 100 may comprise additional components such as one or more network interfaces, input ports, output ports and so on, as is of course well-known to the skilled person.

In an embodiment, the computer system 100 is adapted to host a plurality of virtual machines on the processor units 110. In the context of the present invention, a virtual machine is a software representation of a computing device capable of hosting anything from a single computer program to a complete operating system, and which may be present itself as a separate system to the user of the computer system 100, such that the user has no awareness of the underlying computer system 100. For instance, in the case of the computer system 100 embodying a local area network (LAN) server having a plurality of processors each comprising a number of cores, the user accessing the LAN will be able to engage with the services hosted by the VMs but will be unaware of the underlying server. These concepts are of course well-known per se and will not be explained in further detail for the sake of brevity only.

One of the attractions of virtualization is improved robustness due to the ability to provide failover between VMs, as previously explained. The this end, a copy of a VM is periodically updated to ensure that the copy accurately represents the actual state of the original VM in case the original VM exhibits a failure and will have to fail over to the copy, as it is preferable that the one or more users of the VM are unaware of the failover. In the remainder, the original VM will be referred to as the primary VM and its copy will be referred to as the secondary VM.

Such synchronization between the primary VM and the secondary VM typically requires the temporary suspension of the primary VM to ensure that its state does not change during the synchronization. The duration of such suspension should be kept to a minimum to ensure that the one or more users of the VM are not noticeably affected by the temporary suspension.

To avoid such performance penalties, it is common practice to create differential checkpoints, in which only changes in the state of an entity are captured. Such checkpoints may be generated by writing the address and data from a cache line to a secondary memory such as a level-2 cache or the system memory 140 as soon as the data in a cache line is altered, as for instance is disclosed in U.S. Pat. No. 5,893,155 for the purpose of database roll-back. When using such checkpoint generation for VM replication purposes, it has the drawback that a large amount of data may be unnecessarily communicated during operation of the primary VM; for instance, if a cache line of the cache 120 used by the primary VM is updated multiple times during the operation mode of the primary VM, previous versions of the data in the cache line are unnecessarily written to the secondary memory as this 'old' data has become redundant.

Figure 2:
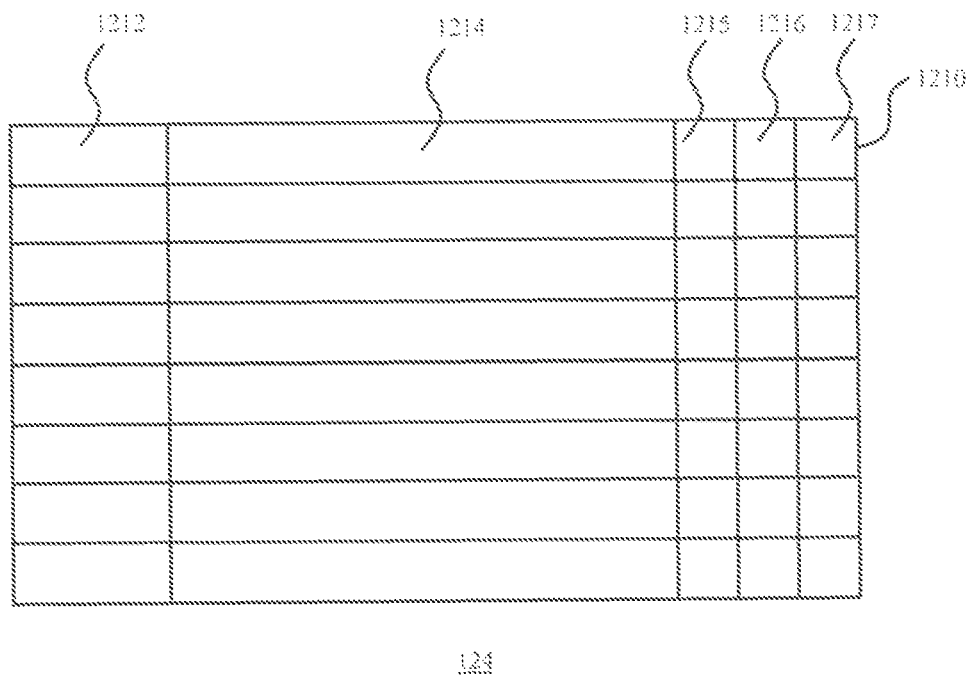
FIG. 2 schematically depicts an aspect of a computer system according to an embodiment of the present invention in more detail.

An example architecture of the data storage part 124 of a cache 120 is shown in FIG. 2. The data storage part 124 comprises a plurality of cache rows 1210, with each cache row 1210 including a tag 1212 including the address of the data in memory 140, a cache line 1214 and a number of flag bits. The flag bits typically include a valid bit 1215, which signals if the cache line 1214 is still relevant to the processor unit 110 and a dirty bit 1216, which signals if the cache line 1214 has been altered such that it needs writing back to the address in memory 140 stored in the tag 1212.

In accordance with an embodiment of the present invention, the cache rows 1210 of a cache 120 capable of containing dirty cache lines further comprise a VM image modification bit flag 1217 that signals whether the cache line 1214 is modified by a processor unit 110 executing a VM. In other words, this flag signals if the modified cache line 1214 forms part of a VM image. In operation, the cache controller 122 will set both the dirty bit flag 1216 and the VM image modification flag 1217 to true upon a write access of the cache line 1214 by the processor unit 110 during the execution of a VM. The purpose of this will be explained in more detail later.

Upon returning to FIG. 1, the processor unit 110 hosting a primary VM typically includes a replication manager, which may be included in the design of a hypervisor, and/or which may be realized in hardware, in software, or a combination of hardware and software. According to an embodiment of the present invention, the replication manager is adapted to create a log in the system memory 140 for logging the memory addresses of the cache lines 1214 modified during the execution of the VM. Preferably, the data in the log is only accessible to the replication manager of a processor unit including other processor units 110 of the computer system 100 or processor units 110 of another computer system 100 as will be explained in more detail later.

Figure 3:
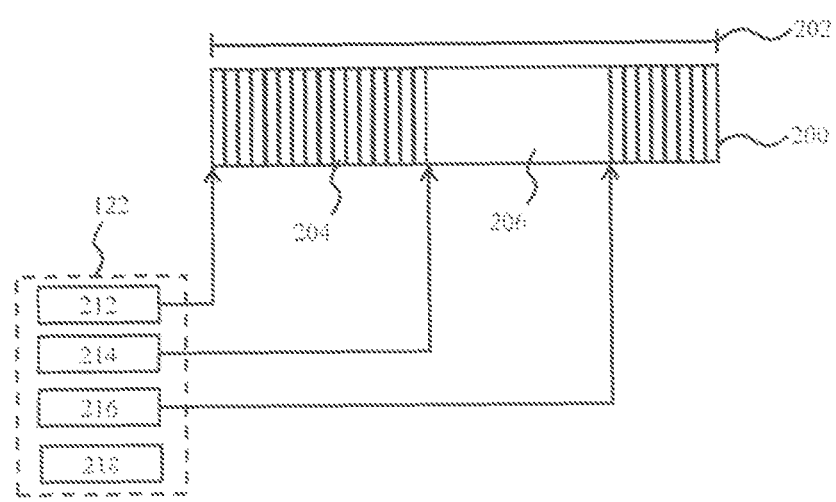
FIG. 3 schematically depicts another aspect of a computer system according to an embodiment of the present invention in more detail.

In an embodiment, the memory address log in the memory 140 has a defined size and allocation to avoid corruption of the memory 140. Any suitable implementation of such a log may be chosen. A particularly suitable implementation is shown in FIG. 3. In this embodiment, the log is defined as a circular buffer 200 in the system memory 140, and has a size 202 defined by the replication manager, e.g. the hypervisor of the processor unit 110. The log 200 is designed to comprise a plurality of memory addresses in memory locations 204. A portion 206 is shown to indicate unused memory locations in the log 200.

In order to facilitate the management of the log 200 during the execution of a VM on the processor unit 110, the computer system 100 includes a set of registers including a first register 212 in which the base address of the circular buffer 200 is stored, a second register 214 in which the next available address of the circular buffer is stored, a third register 216 in which the starting point of the circular buffer 200 is stored and a fourth register 218 in which the size 202 of the circular buffer 200 is stored. The set of registers are preferably located on the processor unit 110. Alternatively, the set of registers may form part of the cache controller 122.

During initialization of the log 200, the replication manager, e.g. the hypervisor, of the processor element 110 will populate the registers 212, 214, 216 and 218 with the appropriate values after which execution of the VM on the processor unit 110 may start or resume.

In accordance with an embodiment of the present invention, the hardware architecture of the cache controller 122 has been extended such that upon the temporary suspension of the VM by the replication manager of its processor unit 110 to facilitate the replication of the VM image and in response to a signal from the processor unit 110 requesting that the memory addresses in the tags 1212 of the modified cache lines 1214 should be made available for replication of the VM image, the cache controller 122 is adapted to traverse the cache 120 and inspect the VM image modification bit flags 1217, and write the memory addresses of the cache lines 1214 to the log 200 of the cache lines 1214 that have a VM image modification flag 1217 set to true, and to clear the VM modifications flags 1217 once the corresponding memory addresses have been written to the log 200.

Figure 4:
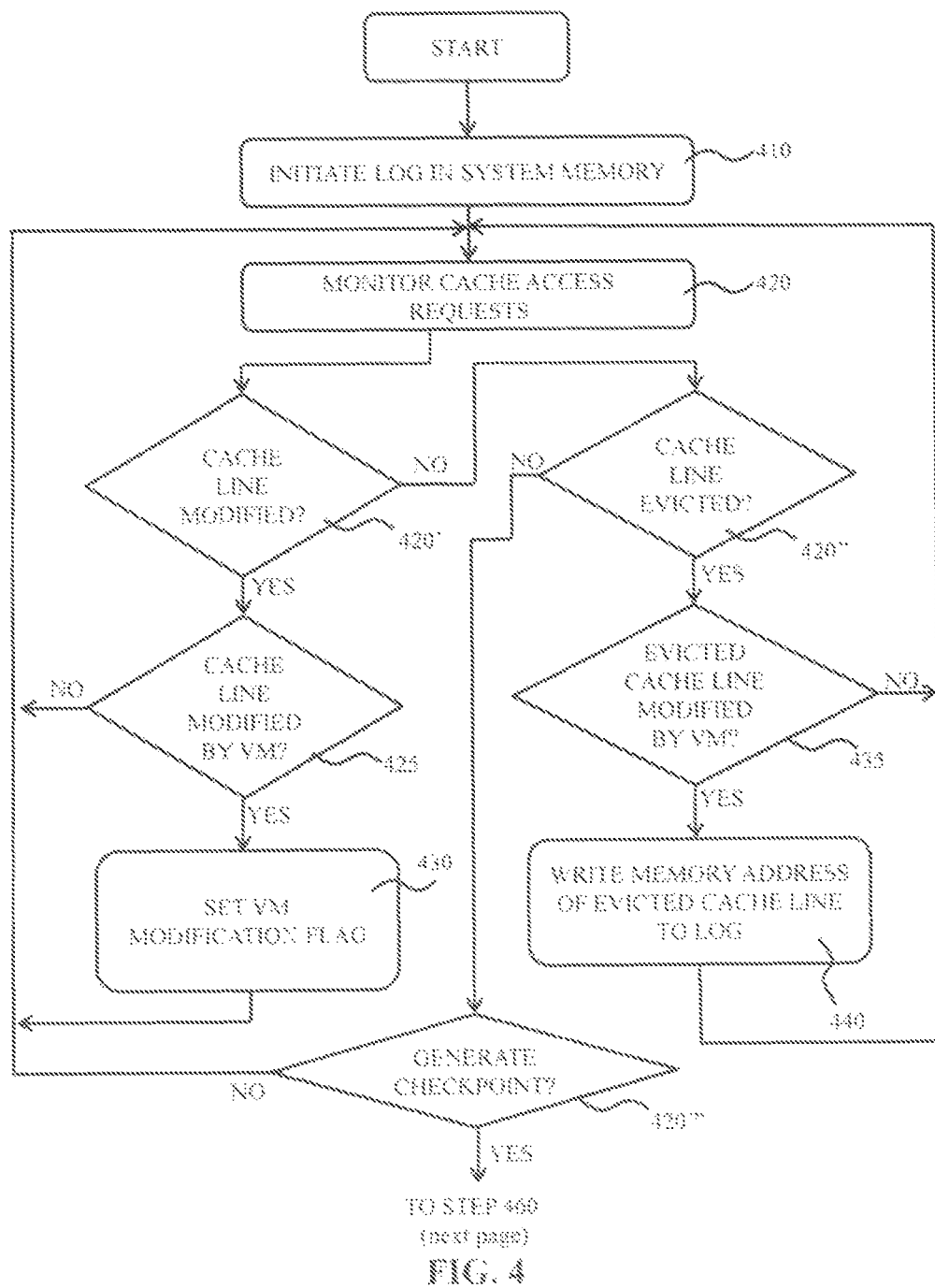
FIG. 4 schematically depicts a flow chart of an aspect of a method of updating computer system according to an embodiment of the present invention.
Figure 4:
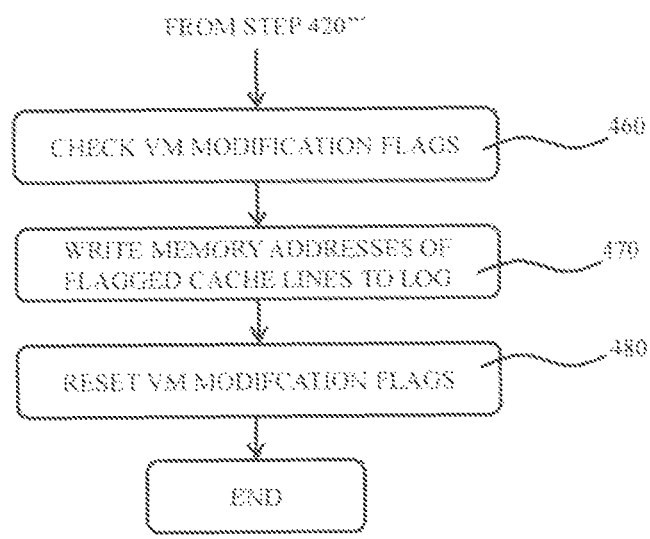

This is explained in more detail with the aid of FIG. 4, which shows a flowchart of an example embodiment of such an updating method. After starting the method, the replication manager creates the log in the system memory 140 in step 410 and stores the relevant values of the base address, initial address (starting point), next available address and log size in the registers 212, 214, 216 and 218 as previously explained. The cache controller 122 subsequently monitors and handles in step 420 accesses to the cache lines in the line memory 124 of the cache 120 by the processor unit 110 (or any other processor unit).

In addition, the cache controller 122 performs a number of checks in step 420, which checks have been identified in FIG. 4 as steps 420', 420" and 420'" respectively. In step 420', the e.g. cache controller checks if the cache line access has caused a modification of the accessed cache line, in which case the cache controller set the flag 1216 signaling the cache line as being dirty, as is well-known per se. In case of such a modification of a cache line, the method proceeds from step 420' to step 425, in which the cache controller 122 further checks if such a dirty cache line has been generated during the execution of a VM. If this is the case, the cache controller 122 also sets the VM image modification flag 1217 signaling the cache line as being a dirty cache line belonging to a VM image in step 430 before returning to step 420.

If the cache access does not lead to the modification of a cache line but instead causes the eviction of a cache line from the cache 120, as checked in step 420", the method proceeds from step 420" to step 435 in which the cache controller 122 checks if a cache line to be evicted from the cache 120 is flagged as being modified by the VM, i.e. checks if the VM image modification flag 1217 of the cache line to be evicted is set to true. In case such a modified cache line is evicted from the cache, e.g. because of a fresh cache line requested by the processor unit 110 forces the eviction of a modified stale cache line from the cache 120 or because of a further processor unit 110 requests sole access to a modified cache line residing in the cache 120, the cache controller 122, e.g. the cast-out engine or the snoop-intervention engine, writes the memory address of the evicted cache line to the log 200 in step 440, to ensure that this modification is captured in the log 200, after which the method returns to step 420. Obviously, when replacing such a cache line 1214 in the cache 120, its flags 1215, 1216 and 1217 are cleared or reset to the values that are appropriate for the fresh cache line. In case the cache access request does not involve the eviction of a cache line, it is further checked in step 420'" if the cache access request is a request to generate a VM checkpoint. Such a request may originate from the replication manager of the processor unit 110 hosting the VM, or alternatively may originate from a replication manager of another processor unit responsible for replicating the changes to the primary VM image during the execution of the VM in a secondary VM image. Preferably, step 420'" occurs periodically, i.e. at regular intervals, to ensure that the secondary VM image is regularly updated. Any suitable checkpoint generation frequency may be chosen.

It is noted for the avoidance of doubt that the checks 420', 420" and 420'" are shown as a sequence of steps for the sake of clarity only. It should be understood that the cache controller 122 does not have to perform each of these checks to decide what cause of action should be taken next. It is for instance equally feasible that the cache controller 122 may immediately recognize that a cache line eviction or a VM image replication is required, in which case the cache controller 122 may proceed from step 420 directly to step 435 or step 460 respectively.

Upon detecting the checkpoint generation instruction in step 420'", the cache controller 122 traverses the cache 120 and inspects in step 460 the VM image modification flag 1217 of all cache rows 1210 that comprise such a flag. Upon detection of a VM image modification flag 1217 set to true, the cache controller retrieves the memory address of the associated cache line 1214 from tag 1212 and writes the retrieved memory address into the log 200 in step 470. To this end, the cache controller 122 retrieves the pointer of the next available address in the log 200 from the register 214, e.g. fetches this pointer or requests this pointer from the replication manager of the processor unit 110.

At this point, the pointer in register 214 will need updating to ensure that no memory addresses are overwritten. The pointer is preferably updated by the cache controller 122 or alternatively by the replication manager, e.g. the hypervisor, of the processor unit 110, although the latter implementation may negatively impact on the performance of the hypervisor in case cache lines are frequently expelled, which is the case in most operating scenarios in which caches are utilized. In an embodiment, this updating step comprises moving the pointer forward by offsetting the pointer presently stored in the register 214 with the size of the stored memory address and writing this offset value in the register 214.

It is furthermore necessary to check if the next available address in the log 200 to be stored in register 214 should be wrapped around to the base address. In an embodiment, the cache controller 122 or the replication manager of the processor unit 110 will check if the next available address equals the base address+size of the log 200 as this indicates that the boundary of the address range of the log 200 in the system memory 140 has been reached, and will set, i.e. wrap around, the next available address to the base address if this is the case.

After completing step 470, the cache controller 122 subsequently resets the VM image modification flag to false in step 480. Step 480 may be executed at any suitable point in time, e.g. after each write action to the log 200, or after all write actions to the log 200 have been completed.

At this point, it is reiterated that any suitable cache architecture may be used for the cache 120. It is known per se that such architectures may include different types of caches, such as a combination of a write-through cache and one or more write-back caches. A write-through cache retains data in the cache and at the same time, i.e. synchronously, pushes the data into a next level of the cache. This provides fast access times for subsequent reads of the cache lines 1214 by the processor 110 at the cost of slower write actions, as the writer has to wait for the acknowledgement that the write action has been completed in the (slower) next level cache. By definition, a write-through cache does not contain dirty cache lines, as the cache lines are 'cleaned up' in one of the next level caches. Hence, where an embodiment of the present invention includes a cache architecture including a write-through cache, the VM image modification flags 1217 may be omitted from the write-through cache and may be added to only those caches that can contain dirty cache lines, e.g. write-back caches that do not push modified cache lines to a next level cache but are responsible for managing data coherency between caches and memory 140 as a consequence. Step 460 is typically applied to all caches to the cache architecture that have cache rows 1210 containing the VM image modification flag 1217, e.g. all write-back caches.

At this point, the replication manager may trigger the replication of the VM image in memory 140 to another memory location, e.g. and other memory or cache by accessing the log 200, fetching the addresses stored in the log 200, fetching the cache lines stored at the fetched addresses and updating a copy of the VM image in the other memory location with the fetched cache lines, as previously explained.

It should be understood that the replication manager triggering the flush of the cache line addresses and the subsequent update of the secondary image of the VM does not have to be the replication manager of the processor unit 110 running the VM. In an embodiment, the replication manager of another processor unit 110 of the computer system 100 may be in charge of this update process.

Generally, the embodiments in which the processor unit in charge of the VM image update process resides on the same computer system 100 as the processor unit 110 running the VM can be seen as embodiments in which the modified cache lines are pushed to another memory location. In an alternative embodiment, modified cache lines may be pulled from their primary memory location by a processor unit on a separate computer system, such as a processor unit responsible for hosting a secondary version of the VM, i.e. a processor unit to which the VM fails over, e.g., in case of a hardware failure of the processor unit hosting the primary VM. In this embodiment (as well as in the embodiment in a different processor unit of the computer system hosting the VM is in charge of the VM image replication process), the processor unit 110 hosting the VM forwards data relevant to the replication of its VM image in memory 140 including the values stored in the registers 212, 214, 216 and 218 to the replication manager of another processor unit, e.g. another processor unit in a different computer system 200 to allow this further replication manager to retrieve the altered cache lines using the addresses in the log 200 as will be explained in more detail later.

In an embodiment, the replication manager, e.g. hypervisor, is further adapted to check if the next available address in register 214 is equal to the initial address stored in register 216 prior to writing a cache line address to the log 200. If the pointers in registers 214 and 216 are the same, this signals that the log 200 is full and that no further addresses can be written to the log 200 as this would cause some of the addresses in the log 200 to be overwritten, thus causing incomplete replication of the primary or original VM image to its copy (the secondary VM image).

If a full log 200 is detected in this manner, the replication manager prevent such a replication error by initiating an immediate failover of the primary VM to a secondary VM hosted on another computer system or by initiating a complete resynchronization of all memory associated with the primary VM and the secondary VM. It will be understood such emergency measures are generally undesirable for performance reasons, such that it is important that the replication manager creates a log 200 that is large enough to store all cast-out memory addresses during the interval between the creation of two checkpoints.

Upon writing the memory addresses of the modified cache lines 1214 in the log 200 in step 470, the method may further comprise the optional step of deduplication addresses in the log 200 to remove multiple instances of the same address in the log 200. This for instance can occur if the frequency at which the memory addresses in the log 200 are used to update a secondary VM image.

At this point, it is noted that FIG. 4 has been described assuming that a primary VM is hosted by a single processor unit 110. It is emphasized that this is by way of non-limiting example only. It is for instance equally feasible that a VM is hosted by several processor units 110, e.g. several microprocessor cores, in which case several logs 200 (one for each core) may be maintained that track different modifications to the VM image in memory 140. In such a scenario, the optional deduplication step may for instance be performed over all logs 200 such that a memory address occurs only once in the combined logs 200 to reduce the amount of data that needs to be copied to the secondary VM during a differential checkpoint generation.

As will be understood by the skilled person, the checkpoint generation may further require synchronization of other relevant states between the primary and secondary VMs, e.g. the state of the CPU, I/O involving disk(s) and network and so on. As such synchronization is known per se, this has not been described in further detail for the sake of brevity only.

FIG. 4 describes an example embodiment of a first operating mode of a processor unit 110, which may be referred to as a producer mode in which the processor unit 110 produces the relevant data required for the replication of the image of the VM in the memory 140 to a copy of this image e.g. in the memory of another computer system. As previously mentioned, a processor unit 110 can also operate in a second operating mode, in which it does not host a VM but is instead responsible for replicating the image of a primary VM. This second operating mode may be referred to as a consumer mode, as a processor unit 110 in this mode is adapted to consume the modified cache lines in the VM image produced by a processor unit 110 executing the VM in its first operation mode or producer mode.

For instance, a further processor unit 110 of the computer system 100 including the processor unit 110 hosting the VM may be responsible for updating a replica of the VM image in a further location, e.g. a memory of another computer system. Alternatively, the processor unit 110 hosting the VM may switch between operating modes to assume responsibility for updating this replica. In yet another embodiment, a processor unit of another computer system, e.g. the computer system on which the replica is stored, is responsible for updating this replica of the VM image.

The update of the VM image replica ensures that a processor unit 110 of a computer system 100 storing the replica in its memory can take over execution of the VM upon a hardware failure in the computer system 100 hosting the primary VM, leading to the termination of the execution of the primary VM on this system.

In an alternative embodiment, the second operation mode is not a separate operating mode but forms part of the first operating mode, in which case the processor unit 110 responsible for the execution of the primary VM also is responsible for updating the replica of the VM in the further memory location.

It should be understood that in a computer cluster comprising multiple computer systems 100, some processor units 110 may be in producer mod (i.e. VM hosting mode) whilst other processor units 110 are in consumer mode (i.e. in VM image replication mode). Even a single computer system in such a cluster may comprise processor units 110 in producer mode as well as in consumer mode, as previously explained. In an embodiment, the replication manager, e.g. the hypervisor, may control whether a processor unit 110 is in producer mode or consumer mode, e.g. by setting a hardware flag for the processor unit 110 such that it can be recognized in which mode a processor unit 110 is operating.

Figure 5:
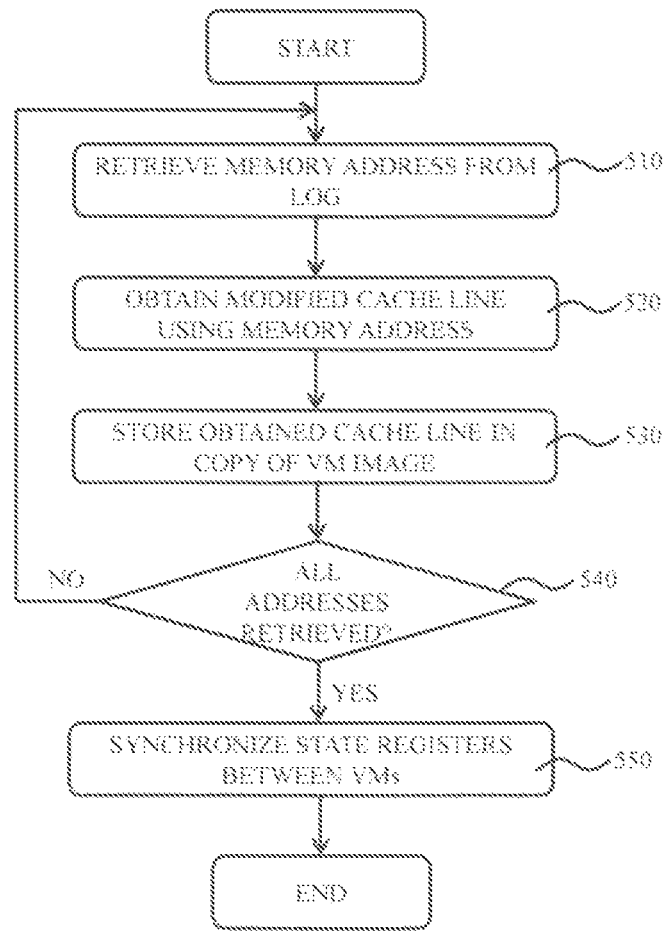
FIG. 5 schematically depicts a flow chart of another aspect of a method of updating computer system according to an embodiment of the present invention.

FIG. 5 depicts a flow chart of the method steps performed during such a second operating mode of a processor unit 110. In the consumer mode, a processor unit 110, e.g. the replication manager of the processor unit 110, receives the relevant information from the replication manager of the processor unit 110 in producer mode, such as the contents of the registers 212, 214, 216 and 218 that will allow the replication manager of the consumer processor unit 110 to access the memory 140 of the computer system 100 including the producer processor unit 110. The replication manager of the producer processor unit 110 may volunteer the relevant information or may provide the relevant information upon a requires thereto by the replication manager of the consumer processor unit 110. Obviously, in an embodiment where the processor unit 110 hosting the VM also acts as the processor unit responsible for updating the secondary VM image, the above step may be omitted.

Upon retrieving the relevant information, the consumer processor unit 110 retrieves the memory addresses stored in the log 200 created by the replication manager of the producer processor unit 110 hosting the primary VM in step 510, and obtains the modified cache lines identified by the memory addresses in step 520. To this end, the consumer processor unit may send a data retrieval request over the bus architecture 130. Such requests are noticed by the cache controllers 122 of the computer system 100, e.g. by the snoop-intervention engines of the cache controllers 122, which will fetch the cache line 1214 from the cache 120 if the memory address in the data retrieval request matches a memory address in one of the tags 1212 of the cache rows 1210 of the cache 120. The requesting processor unit 110 will typically await the response from a cache controller 122 of a further processor unit 110 for a defined period of time, after which the cache controller 122 of the requesting processor unit 110 will fetch the cache line from the memory 140, as a non-response from the other cache controllers 122 will mean that the cache line 1214 no longer resides in cache but has been cast from the cache 120 instead. The handling of such data retrieval requests in a computer system 100 comprising multiple processor units 110 and caches 120 is of course well known per se, and it should be understood that any suitable data retrieval protocol may be applied without departing from the teachings of the present invention.

The consumer processor unit 110 subsequently updates the copy of the VM image accordingly in step 530 by inserting the obtained modified cache line 1214 in the appropriate location of the VM image copy. This process is repeated until all addresses have been retrieved from the log 200 as checked in step 540, after which other state registers, if any, e.g. state registers of the CPU as previously explained, may be replicated as shown in step 550.

At this point, the consumer processor unit 110 may signal the producer processor unit 110 hosting the primary VM that replication is complete, upon which the producer processor unit 110 hosting the primary VM, e.g. its hypervisor, will terminate the suspension of the primary VM and reinitialize the log 200, e.g. reset one or more of the registers 212, 214 and 216 in the cache management module 122.

It should be immediately apparent to the skilled person that various modifications may be possible to the method shown in FIG. 5 without departing from the teachings of the present invention. For instance, the consumer processor unit 110 may have permission to deduplicate the addresses in the log 200 of the producer processor unit 110 hosting the primary VM prior to retrieving the memory addresses from the log 200 in step 510.

In another embodiment, a processor unit 110 in the second operating mode, i.e. consumer mode, is adapted to speculatively process the log 200 of a processor unit 110 in the first operating mode, i.e. producer mode. This embodiment is for instance useful when the consumer processor unit does not trigger the cache controller 122 of the producer processor unit to write the modified cache line addresses to the log 200, e.g. in case the producer processor unit hosting the VM periodically triggers the update of the log 200. This has the advantage that the duration of the suspension of the primary VM can be further reduced as part of the log 200 will already have been processed by the consumer processor unit 110 when the producer processor unit 110 suspends the VM following the request to generate a checkpoint in step 420'''.

Figure 6:
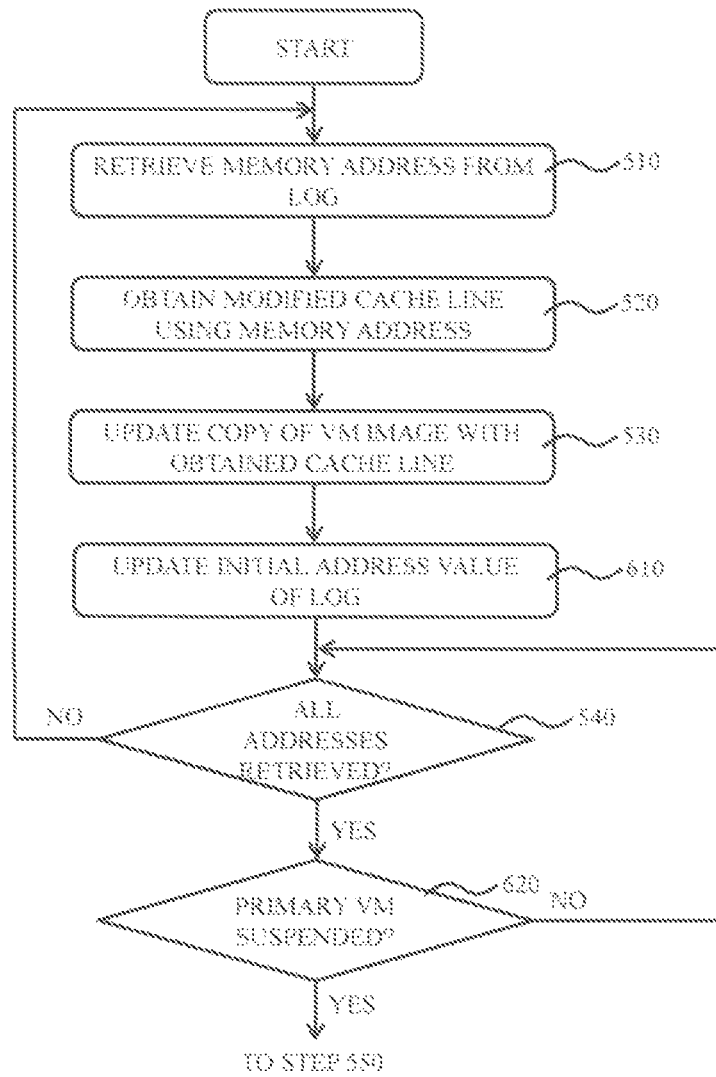
FIG. 6 schematically depicts a flow chart of another aspect of a method of updating computer system according to another embodiment of the present invention.

An example flowchart of this embodiment is shown in FIG. 6. In FIG. 6, several steps are identical to the method of FIG. 5, and these steps will therefore not be explained again for the sake of brevity. In steps 510, 520 and 530 of FIG. 6, the consumer processor unit 110 retrieves a memory address from the log 200 of the processor unit 110 hosting the primary VM, retrieves the data from the memory 140 in the computer system 100 of the producer processor unit 110 and updates the secondary VM image as previously explained.

In additional step 610, the consumer processor unit 110 invokes the update of the initial address value of the log 200 as stored in register 216 associated with the producer processor unit 110 hosting the primary VM. This may be achieved in any suitable way, e.g. by providing the replication manager of the consumer processor unit 110 with write privileges to update this register or by the consumer processor unit 110 instructing the replication manager, e.g. hypervisor of the producer processor element 110 to update this register value accordingly.

Step 610 ensures that the available space in the log 200 of the processor unit 110 hosting the primary VM is kept up to date, as the addresses already retrieved by the consumer processor unit 110 may be overwritten, as indicated by the change in the initial address stored in the register 216 associated with the producer processor unit 110 hosting the primary VM to the first address in the log 200 not yet processed by the consumer processor unit 110. This therefore reduces the risk of the log 200 becoming full prematurely as the capacity of the log 200 is effectively increased by the speculative processing of the log 200 by the consumer processor unit 110. When the primary VM becomes suspended, as checked in step 620 and all addresses have been retrieved from the log 200, the method may proceed to step 550 as previously explained in the detailed description of FIG. 5.

In an alternative embodiment (not shown), as soon as the primary VM becomes suspended, step 610 may be omitted from FIG. 6 as it is no longer necessary to update the initial address value of the log 200 as stored in register 216 associated with the producer processor unit 110 hosting the primary VM, as no further addresses will be written to the log 200 and the log 200 will be re-initialized prior to the reactivation of the primary VM.

Figure 7:
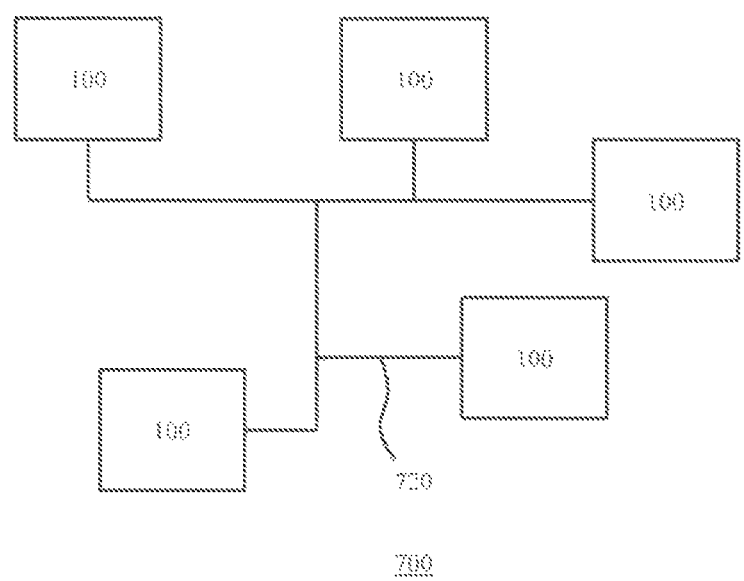
FIG. 7 schematically depicts a computer cluster according to an embodiment of the present invention.

FIG. 7 schematically depicts a computer cluster 700 according to an example embodiment of the present invention. The computer cluster 700 comprises a plurality of computer systems 100 according to one or more embodiments of the present invention, which are communicatively coupled to each other via a network 720. The network 720 may be any suitable data communication network, e.g. a wired or wireless local area network, a wireless or wired wide area network, the Internet and so on. The computer cluster 700 is typically adapted to host a plurality of virtual machines on the processor units 110 of the various computer systems 100 to be utilized by the users of the computer cluster 700. The computer cluster 700 benefits from the VM replication principles of the present invention in that multiple up-to-date or mirror images of a VM may be generated in the respective memories 140 of at least some of the various computer systems 100 such that rapid VM failover can be provided with little overhead.

It should be understood that in the context of the present invention, a computer system is to be interpreted as a device that includes a collection of processor elements that can be utilized in unison. This does not necessarily equate to a single physical entity; it is equally feasible that a computer system is distributed over several physical entities, e.g. different boxes, or that a single physical entity includes more than one computer systems, e.g. several separate groups of processor units.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), and erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer system comprising:
a processor unit adapted to run a virtual machine in a first operating mode;
a multi-level cache memory system accessible to the processor unit, the multi-level cache memory system including a write-back cache and a write-through cache adapted to write cache lines into the write-back cache, wherein, of the write-through cache and the write-back cache, only the write-back cache includes, for each of a plurality of cache lines, a respective associated one of a plurality of image modification flags indicating a modification of the associated cache line caused by the running of the virtual machine; and
a memory, accessible to the write-back cache, that stores an image of said virtual machine; wherein:
the processor unit includes a replication manager adapted to define a log in the memory prior to running the virtual machine in said first operating mode; and
said write-back cache further includes a cache controller adapted to:
periodically check the plurality of image modification flags; and
write a memory address of each associated cache line in the log that are indicated as modified by the plurality of image modification flags.

2. The computer system of claim 1, wherein each processor unit is configured to deduplicate the memory addresses in the log prior to the retrieval of the memory addresses from the log.

3. The computer system of claim 1, wherein:
the log is a circular buffer;
the system comprises a plurality of registers adapted to store:
a first pointer to a wrap-around address of the circular buffer;
a second pointer to the next available address of the circular buffer;
a third pointer to an initial address of the circular buffer; and
the size of the circular buffer; and
the cache controller is adapted to cause an update of at least the second pointer following writing of a memory address in the log.

4. The computer system of claim 1, wherein the cache controller is further adapted to write the memory address of a cache line indicated as modified by the associated image modification flag in the log upon eviction of the cache line from the cache.

5. The computer system of claim 1, further comprising a processor unit adapted to update a further image of the virtual machine in a different memory location by:
retrieving the memory addresses from the log;
obtaining modified cache lines corresponding to the retrieved memory addresses;
updating the further image with said modified cache lines; and
clearing the plurality of image modification flags.

6. The computer system of claim 5, wherein the processor unit adapted to run the virtual machine is the processor unit adapted to update the further image of the virtual machine, wherein the processor unit is adapted to update said further image in a second operating mode.

7. The computer system of claim 6, wherein the replication manager is adapted to switch the processor unit between the first operating mode and the second operating mode.

8. The computer system of claim 5, wherein the processor unit adapted to run the virtual machine and the processor unit adapted to update the further image of the virtual machine are different processor units.

9. A computer cluster comprising a plurality of computer systems according to claim 1 and a network interconnecting the plurality of computer systems.

\* \* \* \* \*